United States Patent
Hamasaki et al.

(10) Patent No.: US 9,476,498 B2
(45) Date of Patent: Oct. 25, 2016

(54) DRIVE DEVICE FOR CONSTRUCTION MACHINE

(71) Applicants: KOBELCO CONSTRUCTION MACHINERY CO., LTD., Hiroshima (JP); Kobe Steel, Ltd., Hyogo (JP)

(72) Inventors: Masatsugu Hamasaki, Hiroshima (JP); Koji Yamashita, Hiroshima (JP); Masashi Kawabata, Hyogo (JP); Shoji Yoichi, Gifu (JP); Ryo Uchiyama, Gifu (JP)

(73) Assignees: KOBELCO CONSTRUCTION MACHINERY CO., LTD., Hiroshima (JP); Kobe Steel, Ltd., Hyogo (JP)

( * ) Notice: Subject to any disclaimer, the term of this patent is extended or adjusted under 35 U.S.C. 154(b) by 78 days.

(21) Appl. No.: 14/397,071

(22) PCT Filed: Apr. 11, 2013

(86) PCT No.: PCT/JP2013/002465
§ 371 (c)(1),
(2) Date: Oct. 24, 2014

(87) PCT Pub. No.: WO2013/161204
PCT Pub. Date: Oct. 31, 2013

(65) Prior Publication Data
US 2015/0126319 A1 May 7, 2015

(30) Foreign Application Priority Data

Apr. 26, 2012 (JP) ................................ 2012-101063

(51) Int. Cl.
| | |
|---|---|
| *F16D 65/853* | (2006.01) |
| *F16D 55/36* | (2006.01) |
| *F16H 57/04* | (2010.01) |
| *E02F 9/12* | (2006.01) |
| *B60T 1/06* | (2006.01) |

(Continued)

(52) U.S. Cl.
CPC ........... *F16H 57/0409* (2013.01); *B60T 1/062* (2013.01); *E02F 9/128* (2013.01); *F16D 55/40* (2013.01); *F16D 65/186* (2013.01); *F16D 2121/04* (2013.01); *F16H 57/045* (2013.01)

(58) Field of Classification Search
CPC ............................. F16D 65/853; F16D 55/36
See application file for complete search history.

(56) References Cited

U.S. PATENT DOCUMENTS

| | | | | |
|---|---|---|---|---|
| 1,967,664 | A | * | 7/1934 | Burns ..................... B60T 11/22 267/34 |
| 2,069,914 | A | * | 2/1937 | Campbell ............... B60T 15/42 137/238 |

(Continued)

FOREIGN PATENT DOCUMENTS

| | | | | |
|---|---|---|---|---|
| CN | 1965458 A | | 5/2007 | |
| JP | 59013144 a | * | 1/1984 | ........... F16D 65/853 |

(Continued)

OTHER PUBLICATIONS

Extended European Search Report issued Jul. 9, 2015 in Patent Application No. 13781954.6.

(Continued)

*Primary Examiner* — Tisha Lewis
(74) *Attorney, Agent, or Firm* — Oblon, McClelland, Maier & Neustadt, L.L.P.

(57) ABSTRACT

A drive device for a construction machine, which includes a speed reducer and a brake mechanism, wherein the speed reducer has a casing in which lubricating oil and the brake mechanism are provided, and wherein the brake mechanism includes: a ring-shaped brake piston; and a brake plate configured to generate a braking force by a pressing force of the brake piston, and wherein the brake piston has: a plurality of oil pockets provided in the brake piston at respective positions along a circumferential direction of the brake piston, each of the oil pockets formed as a space capable of storing lubricating oil; oil inlets allowing lubricating oil rising during operation of the drive device to be introduced into the oil pockets respectively; and oil outlets allowing lubricating oil stored in the respective oil pockets to be discharged.

5 Claims, 4 Drawing Sheets

(51) Int. Cl.
  *F16D 55/40* (2006.01)
  *F16D 65/18* (2006.01)
  *F16D 121/04* (2012.01)

(56) References Cited

U.S. PATENT DOCUMENTS 6,029,786 A * 2/2000 Sommer ................ F16D 55/40
                                                          192/113.36
2008/0029354 A1    2/2008 Yoshimatsu et al.

FOREIGN PATENT DOCUMENTS

| JP | 4 41554 | 4/1992 | |
|----|---------|--------|---|
| JP | 5-296269 A | 11/1993 | |
| JP | h0648028 b2 * | 6/1994 | F16D 65/84 |
| JP | 2006 25580 | 1/2006 | |
| JP | 2008 232269 | 10/2008 | |
| JP | 2008 232270 | 10/2008 | |
| JP | 2011 214586 | 10/2011 | |
| JP | 2012 77862 | 4/2012 | |

OTHER PUBLICATIONS

International Search Report Issued Jul. 2, 2013 in PCT/JP13/02465 Filed Apr. 11, 2013.
Office Action issued on Nov. 11, 2015 in Korean Patent Application No. 10-2014-7032166 with partial unedited computer generated English translation.

* cited by examiner

DRIVE DEVICE FOR CONSTRUCTION MACHINE

TECHNICAL FIELD

The present invention relates to a drive device for driving a driven unit such as an upper slewing body, in a construction machine such as a shovel.

BACKGROUND ART

The background art will be described by taking a slewing drive device of a shovel as an example.

A shovel comprises a crawler-type lower traveling body, an upper slewing body mounted on the lower traveling body in such a manner as to be slewable about an axis perpendicular to a ground surface, and a work attachment attached to the upper slewing body.

A slewing drive device of the shovel is designed to cause slewing of the upper slewing body. The slewing drive device comprises: a hydraulic or electric motor as a drive source; and a speed reducer equipped with a gear mechanism operable to reduce a speed of rotation of the motor, and configured to transmit the rotation reduced in speed by the gear mechanism to the upper slewing body as a driven unit.

The motor and the speed reducer are arranged side-by-side in an axial direction of the slewing drive device in such a manner that respective rotational axes thereof are aligned with each other. The motor and the speed reducer are attached to an upper frame in a vertical posture where the motor is disposed above the speed reducer.

The speed reducer comprises a single-stage or multi-stage planetary gear-type speed reducing unit having a sun gear, a planetary gear and a ring gear. An output of the speed reducer is transmitted to the upper slewing body, thereby causing slewing of the upper slewing body.

The speed reducer has a casing containing lubricating oil therein. Based on this lubricating oil, lubrication of the single or multi-stage speed reducing unit (planetary gear mechanism) is performed. During operation of the slewing drive device, according to a centrifugal force and a pumping action caused by a movement of the speed reducing unit, a part of lubricating oil in the casing, specifically, a portion of the lubricating oil located on the side of an outer periphery thereof, is urged to rise along an inner wall surface of the casing, so that an oil surface of the lubricating oil in the casing has an inverted cone shape, or the lubricating oil in the casing is splattered upwardly. This phenomenon becomes more violent as a temperature of lubricating oil increases, and therefore an oil level thereof rises.

In the lubricating oil in the casing, the upraised portion located on the side of the outer periphery, a portion, immediately falls inwardly under its own weight, and returns to the speed reducing unit. This lubricating oil returning to the speed reducing unit causes an increase in resistance against the speed reducing unit when it agitates lubricating oil during an operation thereof. This results in giving rise to a problem of an increase in energy loss occurring during the operation of the speed reducing unit.

As a technical means to solve this problem, there have heretofore been known a technique disclosed in the follow Patent Literatures 1 and 2.

In this heretofore-known technique disclosed in these Patent Literatures, a tank is provided outside a casing, and an upper passage and a lower passage with a restricted orifice are provided to extend between an inside and an outside of the casing. Based on this configuration, a portion of lubricating oil upraised to cause an oil surface of the lubricating oil to have an inverted cone shape is introduced into the tank via the upper passage and stored in the tank, and then the lubricating oil stored in the tank is returned to the inside of the casing via the lower passage.

However, in above heretofore-known technique, in the portion of the lubricating oil upraised over the entire inner periphery of the casing to cause the oil surface of the lubricating oil to have an inverted cone shape, only a limited part of the upraised lubricating oil is introduced into the tank via the narrow upper passage, so that the upraised lubricating oil does not reach the tank unless the entire lubricating oil is agitated by a certain level or more of agitating force. Therefore, an amount of oil to be stored becomes small. This results in deterioration of an effect of reducing energy loss occurring when the speed reducing unit agitates lubricating oil.

Moreover, in the above heretofore-known technique, the tank, the upper passage and the lower passage are provided outside the casing, so that a slewing drive device will be complicated in structure and increased in size, as a whole. This is likely to cause a significant increase in production cost of the slewing drive device, and exert negative influences on peripheral layout of the slewing drive device.

Further, in the above heretofore-known technique, from the standpoint of suppressing an increase in size of the slewing drive device, it is not allowed to increase the size of the tank. In this respect, an amount of lubricating oil storable in the tank becomes smaller, and therefore the energy loss reducing effect becomes more deteriorated.

CITATION LIST

Patent Literature

Patent Literature 1: JP 2008-232269A
Patent Literature 2: JP 2008-232270A

SUMMARY OF INVENTION

It is an object of the present invention to simultaneously achieve a reduction of energy loss occurring when lubricating oil is agitated inside a speed reducer during operation of a drive device for a construction machine, and a structural simplification and a size reduction of the drive device.

A drive device for a construction machine according to an aspect of the present invention is a drive device for driving a driven unit of the construction machine, which includes: a motor as a drive source; a speed reducer configured to transmit a rotation of the motor to the driven unit at a reduced speed; and a brake mechanism configured to generate a braking force against the rotation to be transmitted from the speed reducer to the driven unit, wherein: the motor and the speed reducer are arranged side-by-side in an up-down direction in such a manner that centers of respective rotating shafts thereof are aligned with each other and the motor is located above the speed reducer; and the speed reducer has a casing in which lubricating oil and the brake mechanism are provided, and wherein the brake mechanism includes: a ring-shaped brake piston; and a brake plate configured to generate the braking force by means of a pressing force of the brake piston, and wherein the brake piston has: a plurality of oil pockets provided in the brake piston at respective positions along a circumferential direction of the brake piston, each of the oil pockets formed as a space capable of storing lubricating oil; oil inlets allowing lubricating oil rising during operation of the drive device to be introduced into the oil pockets respectively; and oil outlets allowing lubricating oil stored in the respective oil pockets to be discharged.

DESCRIPTION OF EMBODIMENTS

The following embodiments are designed for a slewing drive device of a shovel.

However, in addition to the slewing drive device, the present invention can also be applied to any other drive device having a configuration in which a motor and a speed reducer are arranged side-by-side in an up-down direction in such a manner that centers of respective rotating shafts thereof are aligned with each other, and a casing of the speed reducer contains lubricating oil therein. Further, the present invention can also be applied to any drive device other than a shovel, as long as the drive device has the above configuration.

First Embodiment

Refer to FIGS. 1 to 4

Figure 1:
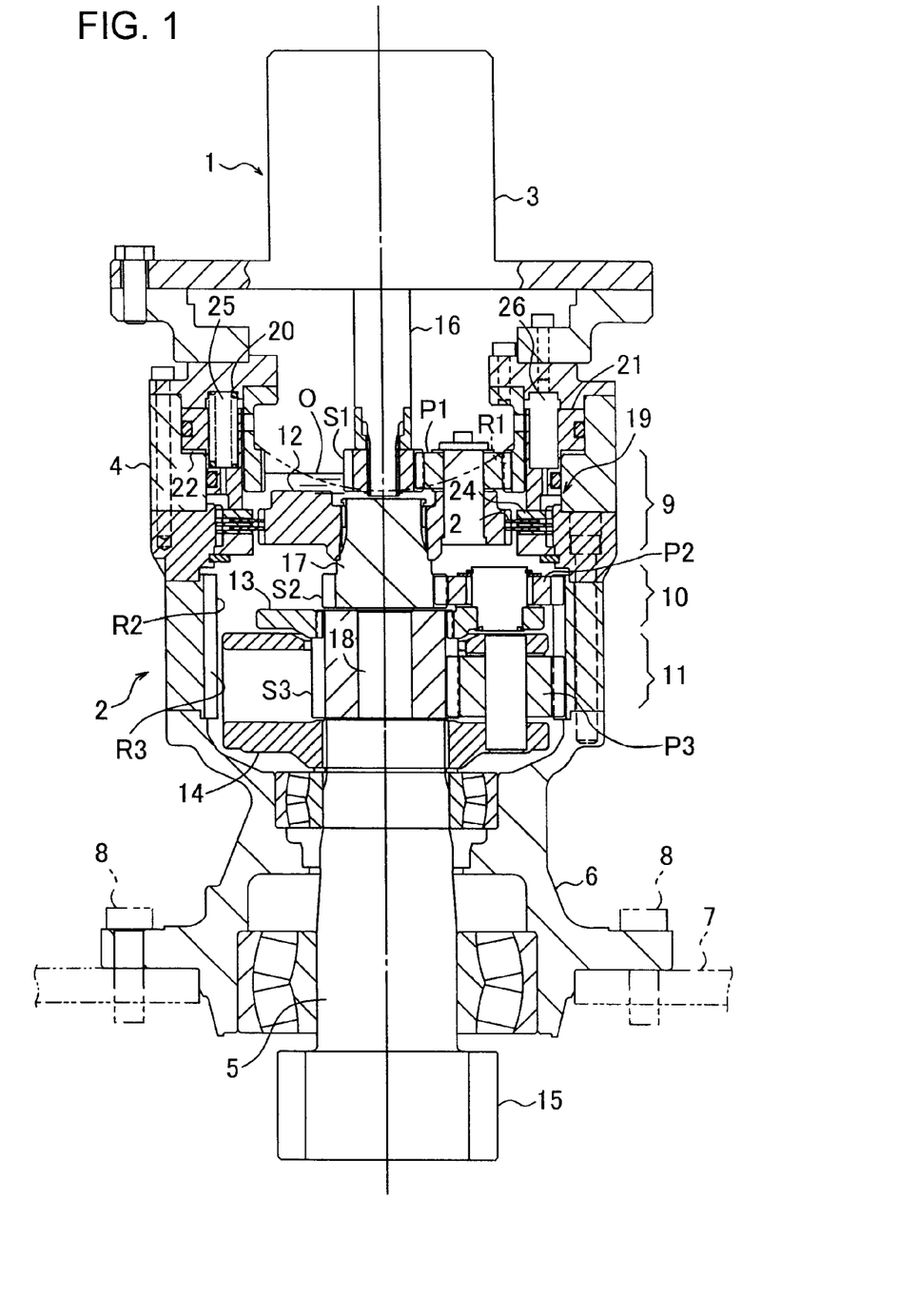
FIG. 1 is a partially-sectional side view of a slewing drive device according a first embodiment of the present invention.

A slewing drive device according to a first embodiment of the present invention is designed to drive an upper slewing body as a driven unit in a shovel, wherein it comprises: a motor 1 as a drive source; and a speed reducer 2 configured to reduce a speed of rotation of the motor 1, and transmit the rotation reduced in speed to the upper slewing body, as illustrated in FIG. 1.

The motor 1 is a hydraulic motor or an electric motor. The motor 1 comprises a motor housing 3. The speed reducer 2 comprises a tubular-shaped reducer casing 4. The reducer casing 4 will hereinafter be referred to simply as "casing 4". The motor 1 and the speed reducer 2 are coupled together by mutually bolt-coupling the motor housing 3 and the casing 4, in a vertical posture where the motor 1 is disposed above the speed reducer 2, and a center of a rotating shaft (motor shaft 16) and a center of each of rotating shafts 17, 18 of the speed reducer 2 are aligned with each other.

The speed reducer 2 comprises a reducer output shaft 5 for outputting rotation reduced in speed by the speed reducer 2, and a shaft support unit 6 supporting the reducer output shaft 5. The shaft support unit 6 is attached to a lower end of the casing 4. The shaft support unit 6 internally has a bearing which supports the reducer output shaft 5 in such a manner as to allow the reducer output shaft 5 to become rotatable. The shaft support unit 6 is also attached to an upper frame 7 of the upper slewing body by a plurality of attaching bolts 8.

The speed reducer 2 comprises: a first rotating shaft 17 and a second rotating shaft 18 each provided inside the casing 4; and a three-stage planetary gear-type speed reducing units 9, 10, 11. The three-stage speed reducing units are constituted of a first speed reducing unit 9, a second speed reducing unit 10 and a third speed reducing unit 11. The casing 4 contains lubricating oil O for lubricating the speed reducing units 9 to 11.

The first speed reducing unit 9 comprises: a first sun gear S1 attached onto the motor shaft 16; a plurality of first planetary gears P1 arranged around the first sun gear S1; a first ring gear R1 provided on an inner periphery of the casing 4; and a first spider 12. The second speed reducing unit 10 comprises: a second sun gear S2 attached onto the first rotating shaft 17; a plurality of second planetary gears P2 arranged around the second sun gear S2; a second ring gear R2 provided on the inner periphery of the casing 4; and a second spider 13. The third speed reducing unit 11 comprises: a third sun gear S3 attached onto the second rotating shaft 18; a plurality of third planetary gears P3 arranged around the third sun gear S3; a third ring gear R3 provided on the inner periphery of the casing 4; and a third spider 14.

The first spider 12 is a carrier which supports the first planetary gears P1 in such a manner as to allow the first planetary gears P1 to become rotatable. The first spider 12 is spline-coupled to an outer periphery of the first rotating shaft 17, so that it is attached to the first rotating shaft 17 in such a manner as to be integrally rotatable with the first rotating shaft 17. The second spider 13 is a carrier which supports the second planetary gears P2 in such a manner as to allow the second planetary gears P2 to become rotatable, and the third spider 14 is a carrier which supports the third planetary gears P3 in such a manner as to allow the third planetary gears P3 to become rotatable.

The first speed reducing unit 9 is configured such that each of the first planetary gears P1 orbitally moves while rotating on its own axis, in a well-known manner, to thereby reduce a speed of rotation of the motor 1 (rotation of the motor shaft 16). The second speed reducing unit 10 is configured such that each of the second planetary gears P2 orbitally moves while rotating on its own axis, in a well-known manner, to thereby further reduce a speed of the rotation reduced in speed by the first speed reducing unit 9. The third speed reducing unit 11 is configured such that each of the third planetary gears P3 orbitally moves while rotating on its own axis, in a well-known manner, to thereby further reduce a speed of the rotation reduced in speed by the second speed reducing unit 10. The rotation reduced in speed by the third speed reducing unit 11 is transmitted to the reducer output shaft 5 to rotate the reducer output shaft 5. Upon rotation of the reducer output shaft 5, a pinion 15 provided on a lower end of the reducer output shaft 5 is rotated while being meshed with an unillustrated slewing gear (ring gear), so that the entire slewing drive device is slewed, and the upper frame 7 of the upper slewing body as a driven unit is slewed.

Figure 2:
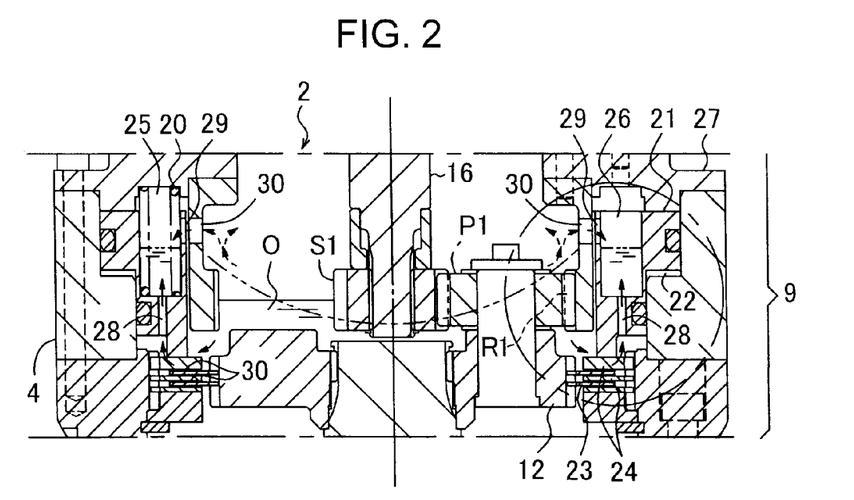
FIG. 2 is a diagram enlargedly illustrating a portion of FIG. 1.

As illustrated in FIGS. 1 and 2, in an operation-stopped state of the slewing drive device, an oil surface of the lubricating oil O in the casing 4 lies at a level capable of immersing, under the oil level, approximately a lower half of the first speed reducing unit 9 as the uppermost speed reducing unit configured to reduce a speed of rotation having the highest speed among the first and third speed reducing units 9 to 11, and is kept horizontal. The oil surface of the lubricating oil O in this state will hereinafter be referred to as "resting oil surface".

On the other hand, during operation of the slewing drive device, each of the speed reducing units 9 to 11 operates, so that the lubricating oil O is agitated, and, a centrifugal force is applied to the lubricating oil O by respective rotations of the sun gears S1 to S3 and the spiders 12 to 14 in the speed reducing units 9 to 11, and respective orbital movements of the planetary gears P1 to P3 in the speed reducing units 9 to 11. According to the centrifugal force applied to the lubricating oil O, a portion of the lubricating oil O on the side of an outer periphery of the oil surface is gradually upraised along an inner wall surface of the casing 4, and consequently the oil surface has an inverted cone shape as a whole, as indicated by the two-dot chain line in FIGS. 1 to 3. Further, during the operation of the slewing drive device, the lubricating oil O is splattered upwardly in all directions according to a pumping action of the speed reducing units 9 to 11.

Lubricating oil upraised along the inner wall surface of the casing 4, and lubricating oil splattered upwardly will hereinafter be referred to collectively and occasionally as "rising lubricating oil".

The slewing drive device according to the first embodiment comprises a disc-type negative brake mechanism 19. This brake mechanism 19 is configured to generate a braking force against rotation to be transmitted from the speed reducer 2 to the upper slewing body. The brake mechanism 19 is provided inside the speed reducer 2 (inside the casing 4).

The brake mechanism 19 comprises: a thick-walled ring-shaped brake piston 21; a plurality of springs 20 applying a downward pressing force to the brake piston 21; a pressure chamber 22 configured such that a hydraulic pressure is introduced thereinto during rotation of the motor 1; and a plurality of rotating shaft-side brake plates 23 and a plurality of casing-side brake plates 24 each arranged beneath the brake piston 21.

Each of the rotating shaft-side brake plates 23 is formed in a ring shape. Each of the rotating-shaft-side brake plates 23 is spline-coupled to an outer periphery of the first spider 12 of the first speed reducing unit 9, so that it is integrally rotatable with the first spider 12, and relatively movable with respect to the first spider 12 in the up-down direction.

On the other hand, each of the casing-side brake plates 24 is spline-coupled to the inner periphery of the casing 4. Thus, each of the casing-side brake plates 24 is attached to the casing 4 in such a manner as to be relatively non-rotatable with respect to the casing 4, and relatively movable with respect to the casing 4 in the up-down direction.

Figure 4:
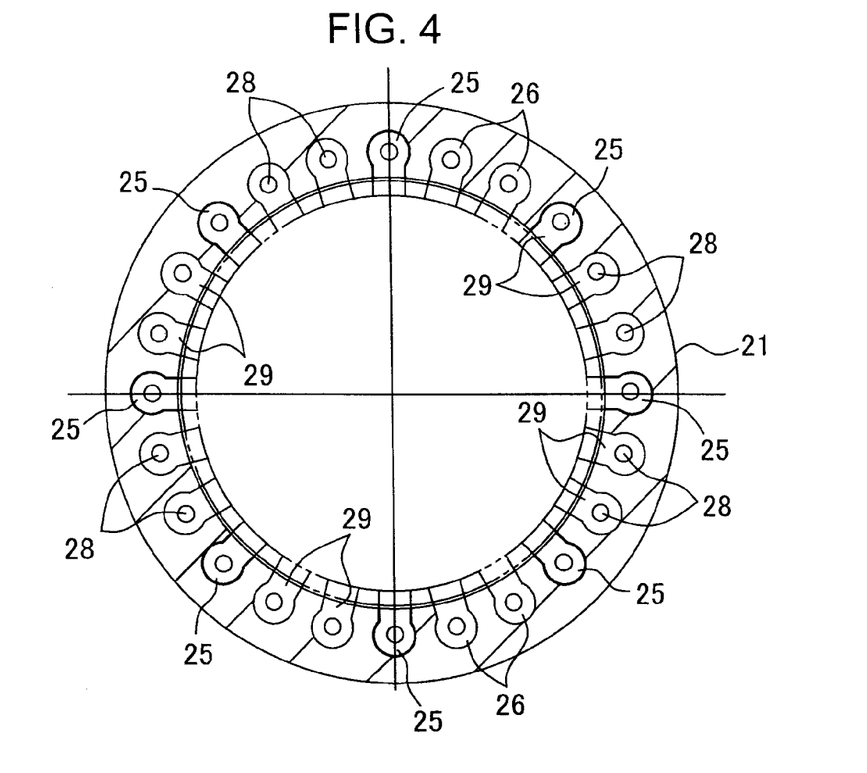
FIG. 4 is a horizontal sectional view of a brake piston in the slewing drive device according the first embodiment.

The brake piston 21 is pressed (biased) downwardly by the plurality of springs 20, in such a manner as to cause the rotating-shaft-side brake plates 23 and the casing-side brake plates 24 to come into press contact with each other to thereby generate a braking force (braking power). As illustrated in FIG. 4, the brake piston 21 has a plurality of spring chambers 25, and a plurality of oil pockets 26. Each of the spring chambers 25 is a space which receives therein the spring 20 (see FIG. 2). The plurality of spring chambers 25 are arranged at intervals in a circumferential direction of the brake piston 21. Each of the spring chambers 25 is formed as a circular hole having a bottom surface. Each of the oil pockets 26 is disposed between a respective two of the spring chambers 25 located in adjacent relation in the circumferential direction of the brake piston 21. Each of the oil pockets 26 is formed as a circular hole having a bottom surface, as with the spring chamber 25. Lubricating oil rising during the operation of the slewing drive device is introduced into and stored in the spring chambers 25 and the oil pockets 26. That is, all of the spring chambers 25 which are originally designed to receive therein the respective springs 20, as an essential element of the brake mechanism 19, additionally serve as oil pockets. The spring chamber 25 is included in a concept of "oil pocket" set forth in the appended claims.

The brake piston 21 is provided in such a manner that the bottom wall of each of the spring chambers 25 and the bottom wall of each of the oil pockets 26 are located above a level position of the resting oil surface. The brake piston 21 is provided in an outer peripheral region of an inner space of the casing 4, in such a manner as to be movable in the up-down direction along an inner peripheral surface of the casing 4.

In FIG. 4, in order to distinguish between the spring chamber 25 and the oil pocket 26, the spring chamber 25 is depicted as a thicker line.

As illustrated in FIG. 2, a spring seat 27 is provided above the brake piston 21 to receive upper ends of the springs 20. Upper end openings of the spring chambers 25 and upper end openings of the oil pockets 26 are closed by the spring seat 27.

Although the spring chamber 25 and the oil pocket 26 are preferably formed as same-shaped circular holes which are identical in terms of diameter, depth, and height position of the bottom surface, in view of machining, it is to be understood that they are formed as circular holes different in diameter or depth.

A bottom portion of the brake piston 21 defining the bottom surfaces of the spring chambers 25 and the bottom surfaces of the oil pockets 26 is provided with a plurality of lower oil inlets 28. The lower oil inlets 28 are provided just beneath the spring chambers 25 and the oil pockets 26, respectively. Each of the lower oil inlets 28 is a through-hole penetrating through the bottom portion of the brake piston 21 in the up-down direction, and is communicated with a corresponding one of the spring chambers 25 or the oil pockets 26 provided just thereabove. The lower oil inlet 28 serves as an oil inlet for introducing lubricating oil into the spring chamber 25 or the oil pocket 26 communicating therewith, from therebeneath. The lower oil inlet 28 additionally serves as an oil outlet for discharging lubricating oil from the spring chamber 25 or the oil pocket 26 communicating therewith. The lower oil inlet 28 has a horizontal cross-sectional area less than a horizontal cross-sectional area of the oil pocket 26. That is, the lower oil inlet 28 has a diameter less than a diameter of the oil pocket 26.

Further, an inner peripheral portion of the brake piston 21 is provided with a plurality of upper oil inlets 29. The upper oil inlets 29 are provided in the inner peripheral portion of the brake piston 21 at respective positions inward of the spring chambers 25 and at respective positions inward of the oil pockets 26, in a radial direction of the brake piston 21. Each of the upper oil inlets 29 is a through-hole penetrating through the inner peripheral portion of the brake piston 21 in the radial direction, and is communicated with a corresponding one of the spring chambers 25 or the oil pockets 26. The upper oil inlet 29 serves as an oil inlet for introducing lubricating oil into the spring chamber 25 or the oil pocket 26 communicating therewith, from a lateral side thereof.

Figure 3:
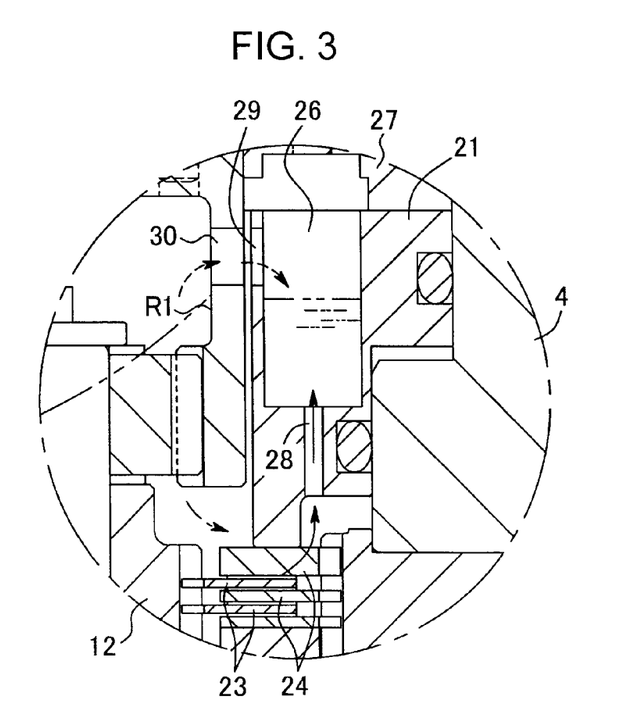
FIG. 3 is a diagram further enlargedly illustrating an encircled area in FIG. 2.

The first ring gear R1 of the first-stage speed reducing unit 9 is disposed radially inward of the brake piston 21. The first ring gear R1 is provided with a plurality of communication holes 30. The communication holes 30 are provided in the first ring gear R1 at respective positions corresponding to the upper oil inlets 29, i.e., at respective positions inward of the upper oil inlets 29 in the radial direction of the brake piston 21. Each of the communication holes 30 is communicated with a corresponding one of the upper oil inlets 29, so that it can introduce lubricating oil to the upper oil inlet 29, as described later.

When the operation of the slewing drive device is stopped, and a hydraulic pressure to be introduced into the pressure chamber 22 is released, according to a spring force of the springs 20, the brake piston 21 operates to cause the rotating-shaft-side brake plates 23 and the casing-side brake plates 24 to come into press contact with each other to thereby generate a braking force. The generated braking force restricts the rotation of the first rotating shaft 17 and thus the rotation of the second rotating shaft 18 and the reducer output shaft 5, so that the shafts 17, 18, 5 becomes incapable of being rotated. On the other hand, during the operation of the slewing drive device, a hydraulic pressure is introduced into the pressure chamber 22, and therefore the brake piston 21 is moved upwardly, so that the press contact between the rotating-shaft-side brake plates 23 and the casing-side brake plates 24 is released, and no braking force is generated. In this way, braking for the first rotating shaft 17, the second rotating shaft 18 and the reducer output shaft 5 is released.

Figure 5:
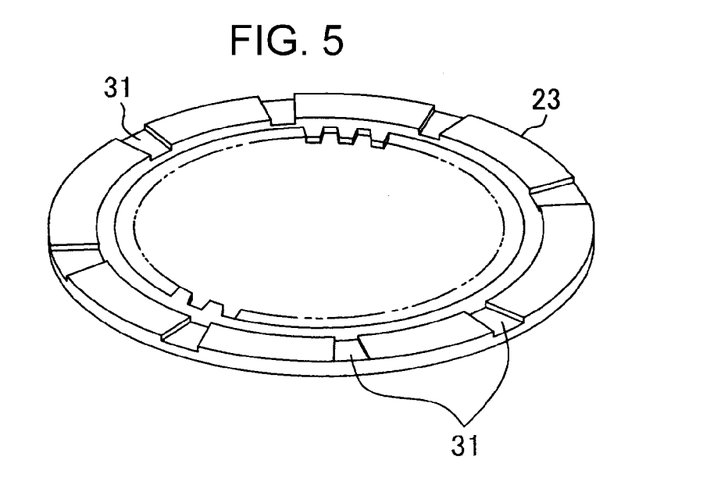
FIG. 5 is a perspective view of a brake plate.

As illustrated in FIG. 5, each of the rotating-shaft-side brake plates 23 is provided with a plurality of concave grooves 31. The plurality of concave grooves 31 are formed in an upper surface of the rotating-shaft-side brake plate 23, and arranged at intervals in a circumferential direction of the rotating-shaft-side brake plate 23. The plurality of concave grooves 31 radially extend with respect to a center of the rotating-shaft-side brake plate 23. As a result of providing the concave grooves 31 in the rotating-shaft-side brake plate 23, upon rotation of the rotating-shaft-side brake plate 23, lubricating oil is urged to rise toward the brake piston 21.

Each of the concave grooves 31 may be formed in a linear line shape with a constant width, or may be formed in a shape gradually widening toward an outer periphery of the rotating-shaft-side brake plate 23 as illustrated in FIG. 5.

In the above configuration, during operation of the slewing drive device (rotation of the motor 1), according to a centrifugal force and a pumping action caused by a movement of the speed reducing units 9 to 11, a portion of the lubricating oil located on the side of an outer periphery of the oil surface is gradually upraised, and the resulting upraised lubricating oil is introduced into the spring chambers 25 and the oil pockets 26 via the lower oil inlets 28, as indicated by the arrowed solid lines in FIGS. 2 and 3, and stored in the spring chambers 25 and the oil pockets 26.

On the other hand, lubricating oil splattered upwardly intrudes into the spring chambers 25 and the oil pockets 26 via the communication holes 30 and the upper oil inlets 29, as indicated by the arrowed broken lines in FIG. 3, and stored in the spring chambers 25 and the oil pockets 26.

Then, after stop of the operation of the slewing drive device, the lubricating oil stored in the spring chambers 25 and the oil pockets 26 is gradually returned to the inner space of the casing 4 via the lower oil inlets 28.

The speed reducer 2 of the slewing drive device according to the first embodiment is equipped with the brake piston 21 which is a member having sufficiently surface area and volume, wherein the brake piston 21 is disposed near the oil surface of the lubricating oil in the casing 4, and near the speed reducing units 9 to 11. With a focus on these points, in the first embodiment, the spring chambers 25, the oil pockets 26 and the lower and upper oil inlets 28, 29 for introducing lubricating oil thereinto are provided in the brake piston 21 at respective positions in the circumferential direction of the brake piston 21, so that lubricating oil rising inside the casing during the operation of the slewing drive device can be introduced into the spring chambers 25 and the oil pockets 26 via the lower oil inlets 28 and the upper oil inlets 29, and efficiently stored therein. Then, after stop of the operation of the slewing drive device, the lubricating oil can be returned from the spring chambers 25 and the oil pockets 26 to the internal space of the casing 4 via the lower oil inlets 29 each additionally serving as an oil outlet. Thus, as compared to the case where lubricating oil is introduced into a tank outside the casing via a narrow passage and stored therein, as in the heretofore-known technique, in the first embodiment, the storage and return of lubricating oil are smoothly performed.

In addition, the spring chambers 25 and the oil pockets 26 for storing lubricating oil are provided in the brake piston 21 originally having sufficient surface area and volume, so that it is possible to sufficiently largely ensure a total capacity of the spring chambers 25 and the oil pockets 26.

These points make it possible to reliably reduce energy loss occurring when the speed reducing units 9 to 11 agitate lubricating oil.

Particularly, in the slewing drive device where an operation state and a stopped state are repeated within a short period of time, the speed reducing units 9 to 11 start moving in a situation where lubricating oil stored in the spring chambers 25 and the oil pockets 26 has not been fully returned to the internal space of the casing 4, i.e., in a situation where an oil level of lubricating oil in the casing 4 is relatively low. Thus, it becomes possible to enhance an effect of reducing the energy loss due to the speed reducing units 9 to 11.

Further, in the first embodiment, extra external equipment and passages as in the heretofore-known technique become unnecessary, which allows structural simplification and size reduction. This makes it possible to prevent a significant increase in production cost of the slewing drive device, and negative influences on peripheral layout of the slewing drive device.

In the first embodiment, the following advantageous effects (i) to (v) can be obtained.

(i) During the operation of the slewing drive device, an outer peripheral upraised portion of lubricating oil in a situation where an oil surface of the lubricating oil has an inverted cone shape is introduced into the spring chambers 25 and the oil pockets 26 via the lower oil inlets 28, and lubricating oil splatter upwardly in all directions when the speed reducing units 9 to 11 agitate lubricating oil is introduced into the spring chambers 25 and the oil pockets 26 via the upper oil inlets 29, so that it becomes possible to efficiently store the rising lubricating oil in the spring chambers 25 and the oil pockets 26.

(ii) The spring chambers 25 and the oil pockets 26 are provided at positions above the resting oil surface of the lubricating oil, wherein the lower oil inlets 28 are provided in the bottom portion of the brake piston 21 at respective positions just beneath the spring chambers 25 and the oil pockets 26, and the upper oil inlets 29 are provided in the inner peripheral portion of the brake piston 21 at respective positions corresponding to the spring chambers 25 and the oil pockets 26, so that only upraised lubricating oil or upwardly splattered lubricating oil during the operation of the slewing drive device is introduced into the spring chambers 25 and the oil pockets 26, whereas, in the operation-stopped state of the slewing drive device, no lubricating oil intrudes into the spring chambers 25 and the oil pockets 26. This eliminates a risk of a reduction in effective oil capacity of the spring chambers 25 and the oil pockets 26 during the operation of the slewing drive device.

(iii) Each of the lower oil inlets 28 is formed in the bottom portion of the brake piston 21, as a hole which has a horizontal cross-sectional area less than a horizontal cross-sectional area of each of the spring chambers 25 and a horizontal cross-sectional area of each of the oil pockets 26, and additionally serves as an oil outlet, so that machining of the brake piston 21 becomes easier as compared to the case where single-purpose oil outlets are provided in the brake piston 21, separately from the lower oil inlets 28.

(iv) The spring chambers 25 which are originally provided as an essential element of the brake piston 21 are additionally used as oil pockets, so that it is possible to minimize an increase in number of oil pockets 26 to be newly provided in the brake piston 21. Thus, machining of the brake piston 21 becomes easier, which makes it possible to reduce the production cost of the brake piston 21.

(v) The rotating-shaft-side brake plates 23 are provided beneath the brake piston 21, in such a manner that they are pressed downwardly by the brake piston 21, wherein the plurality of radially-extending concave grooves 31 are provided in the upper surface of each of the brake plates 23 at respective positions along the circumferential direction of the brake plate 23, so that, along with the rotation of the brake plates 23, lubricating oil is urged to rise toward the brake piston 21. This allows an outer peripheral portion of the lubricating oil upraised to cause the oil surface to have an inverted cone shape, to be more easily introduced into the spring chambers 25 and the oil pockets 26.

Second Embodiment

Figure 6:
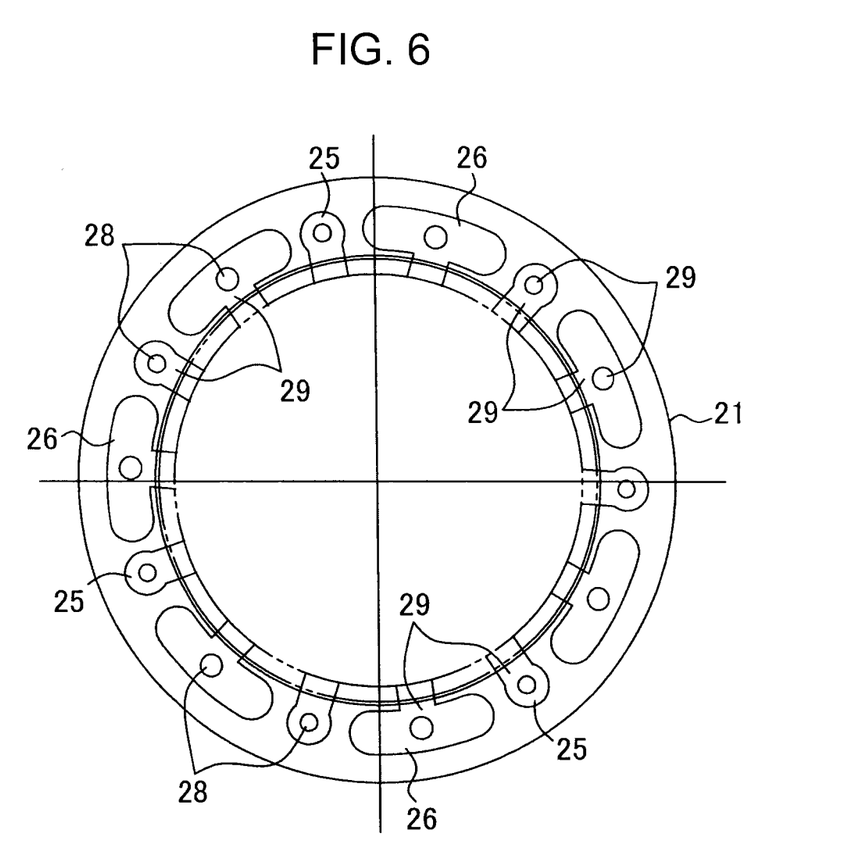
FIG. 6 is a view corresponding to FIG. 4, which illustrates a brake piston in a slewing drive device according a second embodiment of the present invention.

Refer to FIG. 6

As for this second embodiment, only a difference from the first embodiment will be described.

In the second embodiment, a plurality of oil pockets 26 arranged at respective positions along the circumferential direction of the brake piston 21, specifically, a plurality of sets of oil pockets 26 arranged in respective areas between adjacent ones of the spring chambers 25, are formed as elongate holes each of which is elongated in the circumferential direction of the brake piston 21.

The brake piston 21 is provided with the lower and upper oil inlets 28, 29 communicated with the oil pockets 26. This point is the same as the first embodiment.

Each of the oil pockets 26 may be provided with a set of the lower oil inlet 28 and the upper oil inlet 29, as illustrated in FIG. 6, or may be provided with a plurality of the sets.

The second embodiment can obtain fundamentally the same functions and effects as those in the first embodiment.

Other Embodiment (1) In the above embodiments, the rotating-shaft-side brake plates 23 are spline-coupled to the outer periphery of the first spider 12 of the first speed reducing unit 9. Alternatively, the rotating-shaft-side brake plates 23 may be bolt-coupled to the outer periphery of the first spider 12, or may be integrally formed with the first spider 12 so as to constitute a part of the first spider 12. Alternatively, the rotating-shaft-side brake plates 23 may be attached to the first rotating shaft 17, independently of the first spider 12

(2) In the above embodiments, all of the spring chambers 25 are additionally used as oil pockets. Alternatively, the spring chambers 25 may be configured such that only a part thereof are additionally used as oil pockets. Alternatively, the spring chambers 25 may be configured such that none thereof is additionally used as oil pockets.

(3) In the above embodiments, the speed reducer 2 is equipped with the three-stage speed reducing units 9 to 11. Alternatively, the speed reducer 2 may be equipped with only a single-stage speed reducing unit, or may be a two-stage or four or more-stage speed reducing units.

Outline of Embodiments

The above embodiments will be outlined as follows.

The drive device for the construction machine according to the above embodiments relates to a drive device for driving a driven unit of a construction machine, which includes: a motor as a drive source; a speed reducer configured to transmit a rotation of the motor to the driven unit at a reduced speed; and a brake mechanism configured to generate a braking force against the rotation to be transmitted from the speed reducer to the driven unit, wherein: the motor and the speed reducer are arranged side-by-side in an up-down direction in such a manner that centers of respective rotating shafts thereof are aligned with each other and the motor is located above the speed reducer; and the speed reducer has a casing in which lubricating oil and the brake mechanism are provided, and wherein the brake mechanism includes: a ring-shaped brake piston; and a brake plate configured to generate the braking force by means of a pressing force of the brake piston, and wherein the brake piston has: a plurality of oil pockets provided in the brake piston at respective positions along a circumferential direction of the brake piston, each of the oil pockets formed as a space capable of storing lubricating oil; oil inlets allowing lubricating oil rising during operation of the drive device to be introduced into the oil pockets respectively; and oil outlets allowing lubricating oil stored in the respective oil pockets to be discharged.

In the drive device for the construction machine, the brake mechanism provided in the casing of the speed reducer is equipped with the brake piston which is a member having sufficiently surface area and volume, wherein the brake piston is disposed near an oil surface of lubricating oil in the casing, and near a speed reducing unit. With a focus on these points, in the drive device, the oil pockets and the oil inlets for introducing lubricating oil into the oil pockets are provided in the brake piston at respective positions along the circumferential direction of the brake piston, so that lubricating oil rising inside the casing during the operation of the drive device can be introduced into the oil pockets via the oil inlets, and efficiently stored therein. Then, after stop of the operation of the drive device, the lubricating oil can be returned from the oil pockets to the internal space of the casing via the oil outlets. Thus, as compared to the case where lubricating oil is introduced into a tank outside the casing via a narrow passage and stored therein, as in the heretofore-known technique, in this drive device, the storage and return of lubricating oil are smoothly performed. In addition, the oil pockets are provided in the brake piston originally having sufficient surface area and volume, so that it is possible to sufficiently largely ensure a total capacity of the oil pockets. These points make it possible to reliably reduce energy loss occurring when the speed reducing unit (planetary gear mechanism) agitates lubricating oil.

Particularly, in a slewing drive device where an operation state and a stopped state are repeated within a short period of time, the speed reducing unit starts moving in a situation where lubricating oil stored in the oil pockets has not been fully returned to an internal space of the casing, i.e., in a situation where an oil level of lubricating oil in the casing is relatively low. Thus, it becomes possible to enhance an effect of reducing the energy loss due to the speed reducing unit.

Further, in this drive device for the construction machine, extra external equipment and passages as in the heretofore-known technique become unnecessary, which allows structural simplification and size reduction. This makes it possible to prevent a significant increase in production cost of the slewing drive device, and negative influences on peripheral layout of the drive device.

Preferably, in the above drive device for the construction machine, the brake piston is provided in an outer peripheral region of an inner space of the casing, wherein, the oil inlets are provided in the brake piston, the oil inlets including lower oil inlets and upper oil inlets, the lower oil inlets allowing an outer peripheral portion of lubricating oil in a situation where an oil surface of the lubricating oil has an inverted cone shape during the operation of the drive device to be introduced into the oil pockets from therebeneath, the upper oil inlets allowing lubricating oil splattered during the operation of the drive device to be introduced into the oil pockets from lateral sides thereof.

According to this feature, during the operation of the slewing drive device, an outer peripheral upraised portion of lubricating oil in a situation where an oil surface of the lubricating oil has an inverted cone shape is introduced into the oil pockets via the lower oil inlets, and lubricating oil splatter upwardly in all directions when the speed reducing unit agitates lubricating oil is introduced into the oil pockets via the upper oil inlets, so that it becomes possible to efficiently store the rising lubricating oil.

More preferably, each of the oil pockets is provided at a position above a resting oil surface which is an oil surface of lubricating oil in an operation-stopped state of the drive device, wherein each of the lower oil inlets is provided, in a bottom portion of the brake piston, at a position beneath each of the oil pockets, and each of the upper oil inlets is provided, in an inner peripheral portion of the brake piston, at a position inward of each of the oil pockets in a radial direction of the brake piston.

According to this feature, only upraised lubricating oil or upwardly splattered lubricating oil during the operation of the drive device is introduced into the oil pockets, whereas, in the operation-stopped state of the drive device, no lubricating oil intrudes into the oil pockets. This eliminates a risk of a reduction in effective oil capacity of the oil pockets during the operation of the drive device.

More preferably, each of the lower oil inlets is formed as a hole which has a horizontal cross-sectional area less than a horizontal cross-sectional area of each of the oil pockets, and additionally serves as an oil outlet.

According to this feature, each of the lower oil inlets additionally serves as an oil outlet for discharging lubricating oil from the oil pocket after stop of the operation of the drive device, so that machining of the brake piston becomes easier as compared to the case where single-purpose oil outlets are provided in the brake piston, separately from the lower oil inlets.

Preferably, in the above drive device for the construction machine, the brake mechanism includes a plurality of springs for imparting the pressing force to the brake piston, wherein the brake piston has a plurality of spring chambers provided at intervals in the circumferential direction of the brake piston, the spring chambers receiving therein the springs respectively, at least one of the plurality of spring chambers additionally serving as the oil pocket.

According to this feature, at least a part of the plurality of spring chambers which are originally provided as an essential element of the brake piston are additionally used as oil pocket, so that it is possible to minimize an increase in number of oil pockets to be newly provided in the brake piston. Thus, machining of the brake piston becomes easier, which makes it possible to reduce the production cost of the brake piston.

Preferably, in the above drive device for the construction machine, the brake plate is a ring-shaped member provided beneath the brake piston to be pressed downwardly by the brake piston, wherein a plurality of concave grooves are formed on an upper surface of the brake plate at respective positions along a circumferential direction of the brake plate so as to radially extend with respect to a center of the brake plate.

According to this feature, along with the rotation of the brake plate, lubricating oil is urged to rise toward the brake piston. This allows an outer peripheral portion of the lubricating oil upraised to cause the oil surface to have an inverted cone shape, to be more easily introduced into the oil pockets.

As described above, in the above embodiments, lubricating oil rising during the operation of the drive device can be stored efficiently and in a sufficient amount to thereby reliably reduce energy loss occurring when lubricating oil is agitated in the speed reducer, and it is unnecessary to provide extra equipment outside the drive device, so that it becomes possible to realize a structural simplification and a size reduction of the drive device.

The invention claimed is:

1. A drive device for a construction machine driving a driven unit of the construction machine, comprising:
   a motor as a drive source;
   a speed reducer configured to transmit a rotation of the motor to the driven unit at a reduced speed; and
   a brake mechanism configured to generate a braking force against the rotation to be transmitted from the speed reducer to the driven unit, wherein
   the motor and the speed reducer are arranged side-by-side in an up-down direction in such a manner that centers of respective rotating shafts thereof are aligned with each other and the motor is located above the speed reducer; and
   the speed reducer has a casing in which lubricating oil and the brake mechanism are provided,
   and wherein the brake mechanism comprises: a ring-shaped brake piston; and a brake plate configured to generate the braking force by means of a pressing force of the brake piston,
   and wherein the brake piston has: a plurality of oil pockets provided in the brake piston at respective positions along a circumferential direction of the brake piston, each of the oil pockets formed as a space capable of storing lubricating oil; oil inlets allowing lubricating oil rising during operation of the drive device to be introduced into the oil pockets respectively; and oil outlets allowing lubricating oil stored in the respective oil pockets to be discharged,
   wherein the brake piston is provided in an outer peripheral region of an inner space of the casing,
   and wherein the oil inlets are provided in the brake piston, the oil inlets including lower oil inlets and upper oil inlets, the lower oil inlets allowing an outer peripheral portion of lubricating oil in a situation where an oil surface of the lubricating oil has an inverted cone shape during the operation of the drive device to be introduced into the oil pockets from therebeneath, the upper oil inlets allowing lubricating oil splattered during the operation of the drive device to be introduced into the oil pockets from lateral sides thereof.

2. The drive device for the construction machine as defined in claim 1, wherein each of the oil pockets is provided at a position above a resting oil surface which is an oil surface of lubricating oil in an operation-stopped state of the drive device, and wherein each of the lower oil inlets is provided, in a bottom portion of the brake piston, at a position beneath each of the oil pockets, and each of the upper oil inlets is provided, in an inner peripheral portion of the brake piston, at a position inward of each of the oil pockets in a radial direction of the brake piston.

3. The drive device for the construction machine as defined in claim 2, wherein each of the lower oil inlets is formed as a hole which has a horizontal cross-sectional area less than a horizontal cross-sectional area of each of the oil pockets, and additionally serves as an oil outlet.

4. The drive device for the construction machine as defined in claim 1, wherein the brake mechanism comprises a plurality of springs for imparting the pressing force to the brake piston, and wherein the brake piston has a plurality of spring chambers provided at intervals in the circumferential direction of the brake piston, the spring chambers receiving therein the springs respectively, at least one of the plurality of spring chambers additionally serving as the oil pocket.

5. The drive device for the construction machine as defined in claim 1, wherein the brake plate is a ring-shaped member provided beneath the brake piston to be pressed downwardly by the brake piston, and wherein a plurality of concave grooves are formed on an upper surface of the brake plate at respective positions along a circumferential direction of the brake plate so as to radially extend with respect to a center of the brake plate.

\* \* \* \* \*